United States Patent [19]

Suzuki

[11] Patent Number: 5,781,340
[45] Date of Patent: Jul. 14, 1998

[54] GAUSS LENS WITH IMAGE STABILIZING FUNCTION

[75] Inventor: Kenzaburo Suzuki, Kanagawa-ken, Japan

[73] Assignee: Nikon Corporation, Tokyo, Japan

[21] Appl. No.: 587,273

[22] Filed: Jan. 18, 1996

[30] Foreign Application Priority Data

Feb. 10, 1995 [JP] Japan ................. 7-046334

[51] Int. Cl.$^6$ ............. G02B 27/64; G02B 15/14
[52] U.S. Cl. ............... 359/557; 359/554; 359/691
[58] Field of Search ............... 359/554–557, 359/691–693, 738–740, 454, 794; 396/52–55

[56] References Cited

U.S. PATENT DOCUMENTS

| | | | |
|---|---|---|---|
| 4,844,602 | 7/1989 | Kitagishi et al. | 359/557 |
| 4,907,868 | 3/1990 | Kitagishi et al. | 359/557 |
| 4,929,069 | 5/1990 | Shibayama | 359/692 |
| 4,974,950 | 12/1990 | Yamazaki et al. | 359/557 |
| 4,986,643 | 1/1991 | Moriyama | 359/693 |
| 5,000,549 | 3/1991 | Yamazaki | 359/557 |
| 5,000,551 | 3/1991 | Shibayama | 359/708 |
| 5,018,845 | 5/1991 | Yamazaki | 359/557 |
| 5,039,211 | 8/1991 | Maruyama | 359/557 |
| 5,182,673 | 1/1993 | Kikuchi et al. | 359/691 |
| 5,270,857 | 12/1993 | Oizumi et al. | 359/557 |
| 5,337,098 | 8/1994 | Imafugi et al. | 396/55 |
| 5,402,197 | 3/1995 | Okano et al. | 396/55 |
| 5,416,558 | 5/1995 | Katayama et al. | 396/52 |
| 5,530,593 | 6/1996 | Shibayama et al. | 359/554 |
| 5,579,160 | 11/1996 | Sato | 359/557 |

FOREIGN PATENT DOCUMENTS

| | | |
|---|---|---|
| 655 638 | 5/1995 | European Pat. Off. |
| A-57-169716 | 10/1982 | Japan |
| A-60-188918 | 9/1985 | Japan |
| A-62-75412 | 4/1987 | Japan |
| A-63-157120 | 6/1988 | Japan |
| A-3-141313 | 6/1991 | Japan |
| A-5-244160 | 9/1993 | Japan |
| A-6-130291 | 5/1994 | Japan |
| A-6-265788 | 9/1994 | Japan |

*Primary Examiner*—Thong Nguyen
*Attorney, Agent, or Firm*—Oliff & Berridge, PLC

[57] ABSTRACT

A Gauss lens having image stabilizing function with sufficient brightness, back focal length and excellent imaging quality is provided. The present invention includes, in order from object side, at least a first lens group with positive refractive power and a second lens group with positive refractive power. A negative lens component having a divergent surface with a convex surface facing the object side is placed closest to the image side in the first lens group G1 and a negative lens component having a divergent surface with a convex surface facing the image side is placed adjacent to the image side of the aperture stop. A displacement mechanism moves the second lens group in the direction substantially perpendicular to the optical axis to prevent vibration. The focal length f2 of the second lens group and the focal length f of the totality of the lens system satisfy the condition:

$0.2 < f2/f < 4.0$.

20 Claims, 12 Drawing Sheets

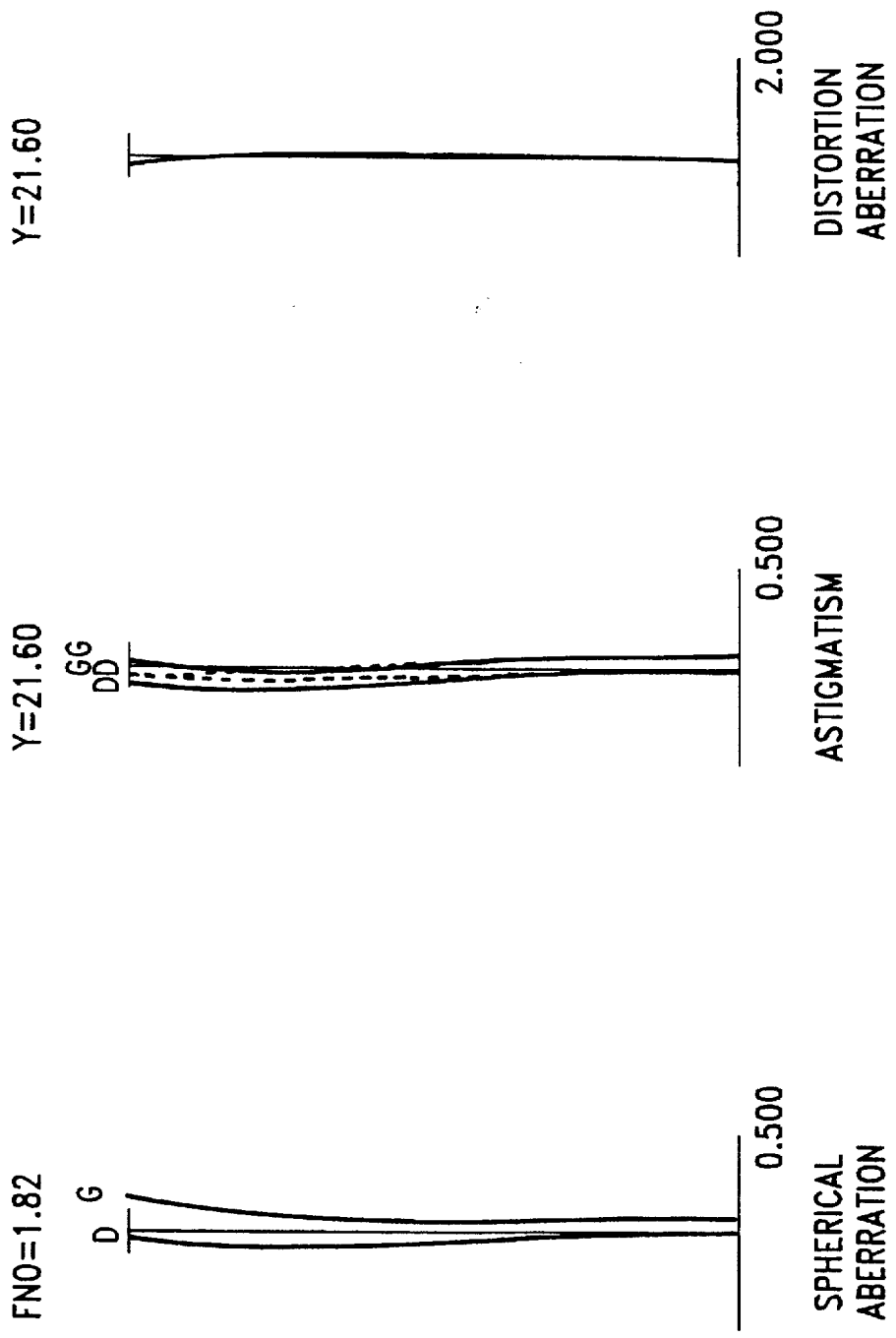

HORIZONTAL ABERRATION BEFORE CORRECTION

HORIZONTAL ABERRATION BEFORE CORRECTION

HORIZONTAL ABERRATION BEFORE CORRECTION

HORIZONTAL ABERRATION DURING CORRECTION

HORIZONTAL ABERRATION DURING CORRECTION

HORIZONTAL ABERRATION DURING CORRECTION

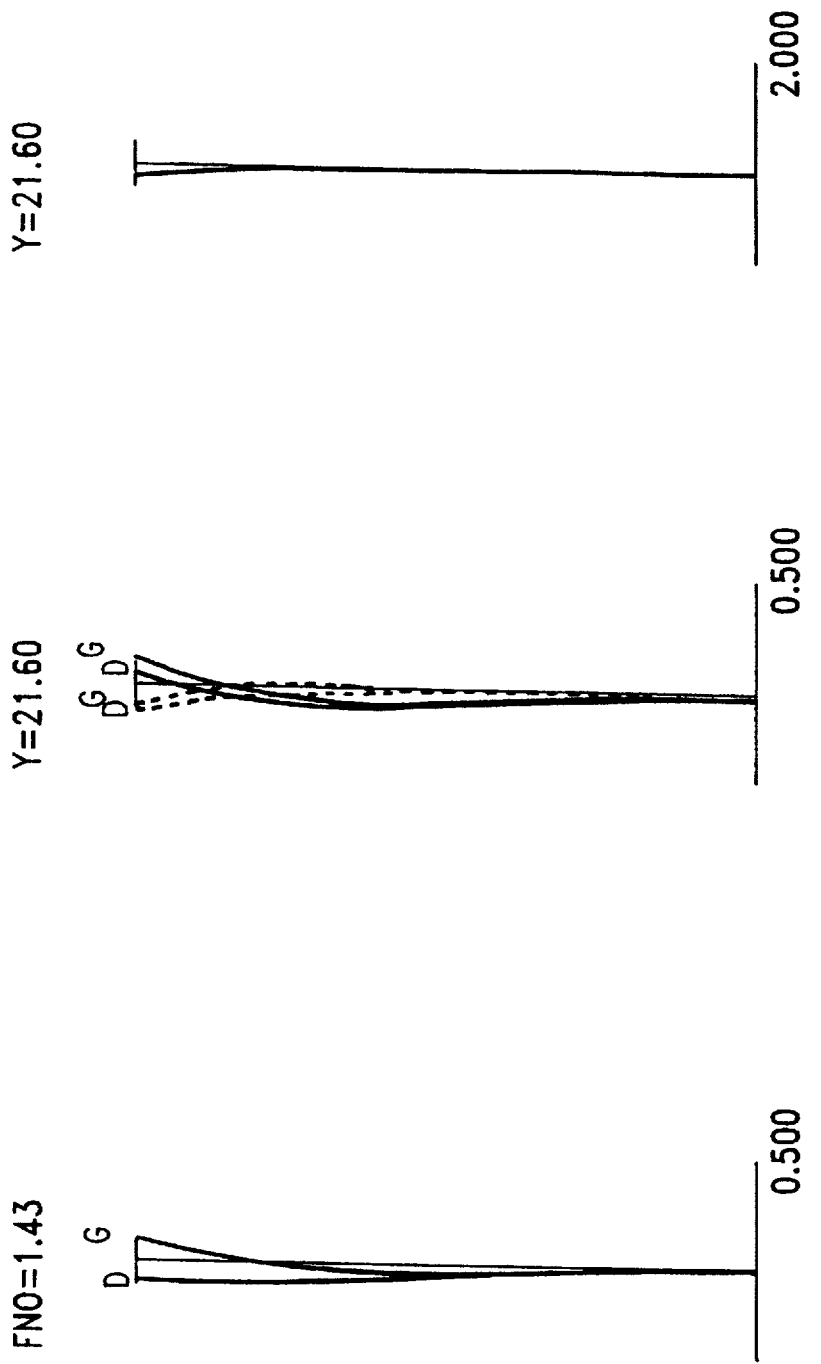

HORIZONTAL ABERRATION BEFORE CORRECTION

HORIZONTAL ABERRATION BEFORE CORRECTION

HORIZONTAL ABERRATION BEFORE CORRECTION

HORIZONTAL ABERRATION DURING CORRECTION

HORIZONTAL ABERRATION DURING CORRECTION

HORIZONTAL ABERRATION DURING CORRECTION

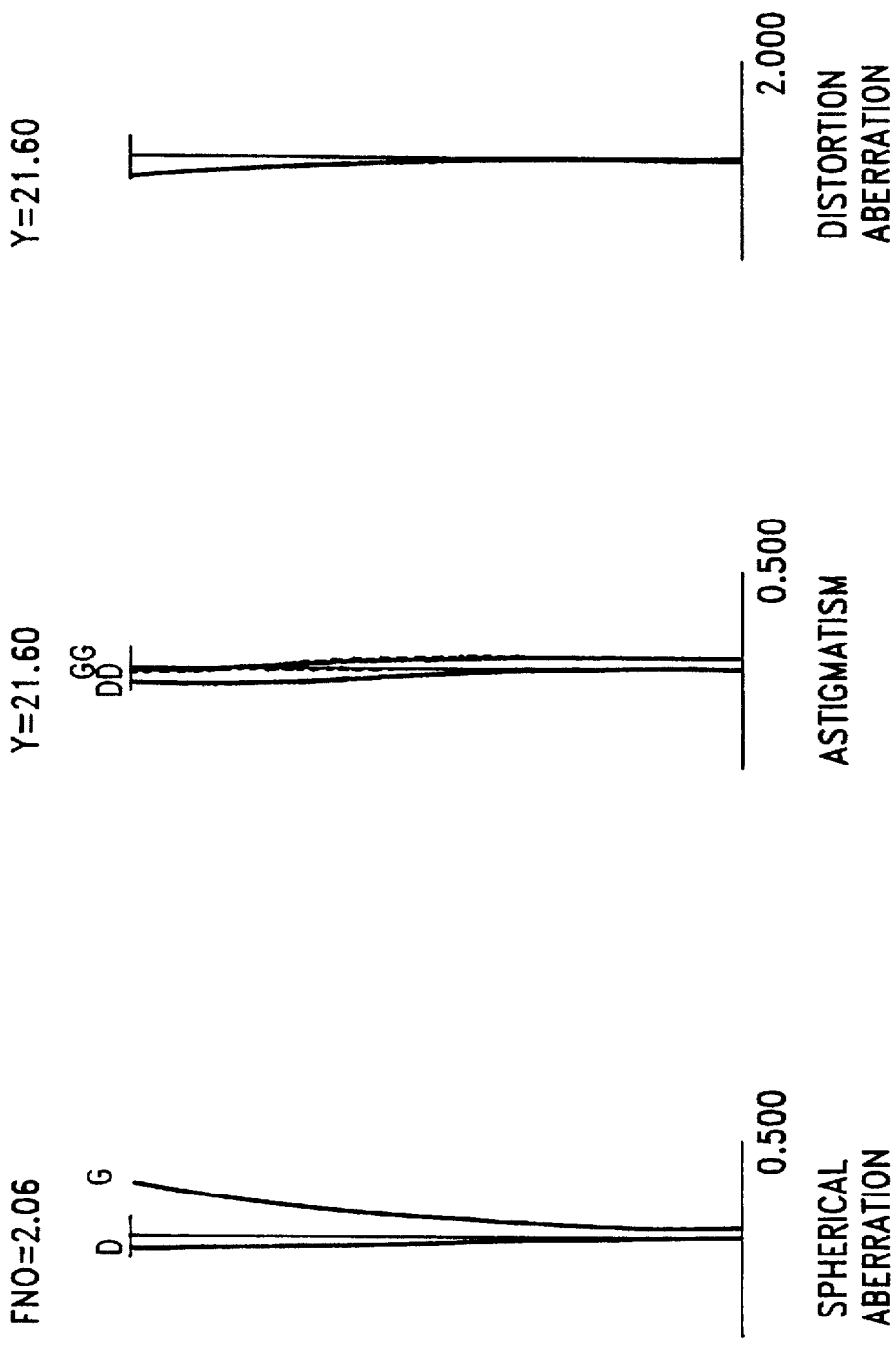

HORIZONTAL ABERRATION BEFORE CORRECTION

HORIZONTAL ABERRATION BEFORE CORRECTION

HORIZONTAL ABERRATION BEFORE CORRECTION

HORIZONTAL ABERRATION DURING CORRECTION

HORIZONTAL ABERRATION DURING CORRECTION

HORIZONTAL ABERRATION DURING CORRECTION

GAUSS LENS WITH IMAGE STABILIZING FUNCTION

BACKGROUND OF THE INVENTION

1. Field of the Invention

The present invention relates to a Gauss lens with image stabilizing function and more specifically, a Gauss lens for use in photographic and video cameras.

2. Background of Related Art

An example of conventional lens with an image stabilizing function is disclosed in Japanese Laid-Open Patent Publication Hei 1 - 19113 and corresponding U.S. Pat. No. 5,270,857.

"Image stabilizing" refers to a process of correcting fluctuation of image position caused by shaking of the hand and the like through movement of lens group in the direction substantially perpendicular to the optical axis.

However, applying conventional technology such as mentioned above with a system having a focal length suitable to range from a standard lens to a telephoto lens, it is impossible to secure sufficient brightness (F-number) and back focal length, and to obtain a good imaging quality.

SUMMARY OF THE INVENTION

Considering the above-stated problems, the present invention aims to provide a Gauss lens having an image stabilizing function, sufficient F-number an adequate back focal length, and excellent imaging quality.

In order to overcome above-mentioned problems, the present invention provides a Gauss lens with an image stabilizing function including, in order from object side, at least a first lens group with positive refractive power and a second lens group with positive refractive power. A negative lens component having a divergent surface with a convex surface facing the object side is placed closest to the image side in the first lens group and a negative lens component having a divergent surface with a convex surface facing the image side is placed adjacent to the image side of an aperture stop. A displacement mechanism moves the second lens group in the direction substantially perpendicular to the optical axis to prevent vibration. The focal length f2 of the second lens group and the focal length f of the totality of the lens system satisfy the following relationship:

$$0.2 < f2/f < 4.0. \tag{1}$$

In a preferred embodiment of the present invention, the focal length f1 of the first lens group, the focal length f2 of the second lens group, and the maximum displacement amount ΔS of the second lens group in the direction perpendicular to the optical axis at the time of the image stabilizing operation satisfy $$\Delta S/f2 < 0.1 \tag{2}$$

$$0.3 < f1/f2 < 5.0. \tag{3}$$

A Gauss lens, which has been used conventionally in a rapid standard lens and medium telephoto lens, is well known for its excellent imaging quality.

To begin with, in a Gauss lens structure, both the totality of the optical system on the object side of the aperture stop and the totality of the optical system on the image side of the aperture stop need to have positive refractive power.

In the lens system of the invention, a lens having positive refractive power with a convex surface facing the object side should be placed closest to the object side. Moreover, second from the object side, a positive meniscus lens with the convex surface facing the object side should be placed.

Furthermore, a negative lens component having a divergent surface with its convex surface facing the object side should be placed closest to the image side of the first lens group. Moreover, a negative lens component having a divergent surface with its convex surface facing the image side should be placed at the image side of the aperture stop.

The aperture stop should be placed between the first lens group and the second lens group or inside the second lens group.

Through the structure and conditions described above, the present invention realizes the optimum conditions for preventing vibration in a Gauss lens.

BRIEF DESCRIPTION OF DRAWINGS

The invention will be described in detail with reference to the following drawings in which like reference numerals refer to like elements and wherein:

FIGS. 2(a), 2(b), 2(c), 2(d), 2(e), 2(f), 2(g), 2(h), and 2(i) show the various aberrations for a infinite photographic state in the first embodiment;

FIGS. 4(a), 4(b), 4(c), 4(d), 4(e), 4(f), 4(g), 4(h), and 4(i) show the various aberrations for the infinite photographic state in the second embodiment;

FIGS. 6(a), 6(b), 6(c), 6(d), 6(e), 6(f), 6(g), 6(h), and 6(i) show the various aberrations for the infinite photographic state in the third embodiment.

DETAILED DESCRIPTION OF PREFERRED EMBODIMENTS

Hereafter, each condition of the present invention will be described.

In the present specification, the term "lens group" designates a portion of the total lens system. Each lens group may comprise one lens or any greater number of lenses. Lens groups are also known as lens units.

Figure 1:
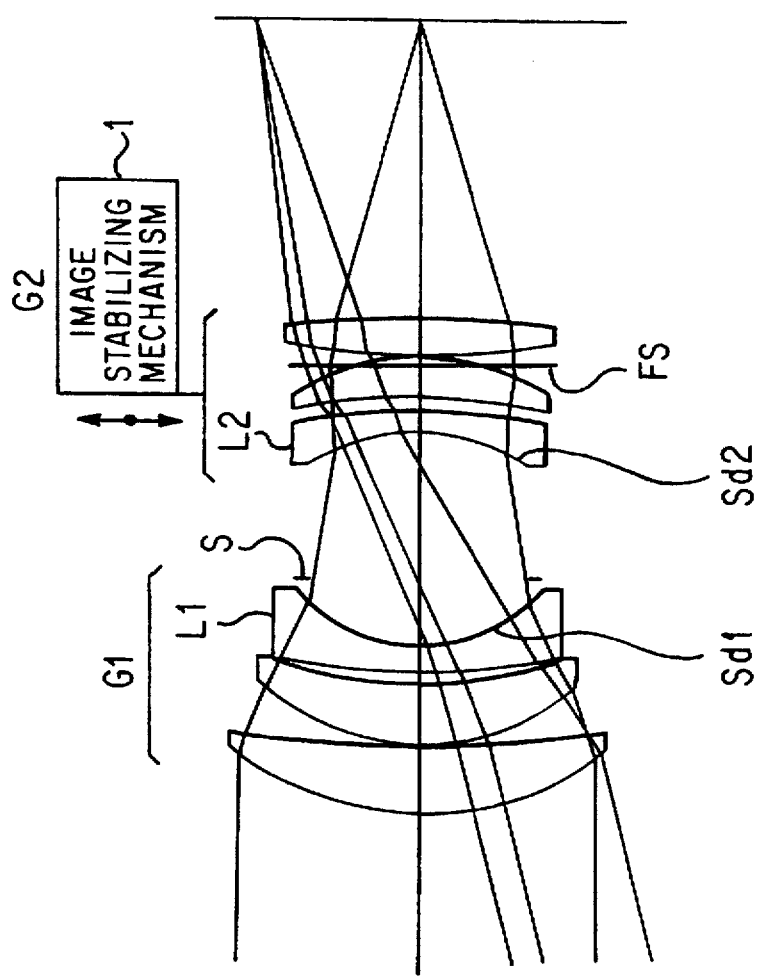
FIG. 1 shows the schematic structure of a Gauss lens in a first embodiment of the present invention.
Figure 2D:
Figure 2E:
Figure 2F:
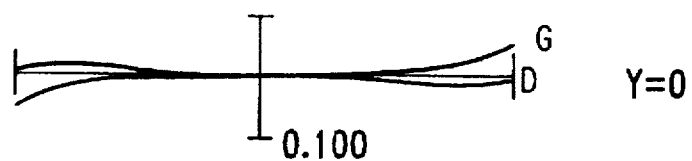
Figure 2G:
Figure 2H:
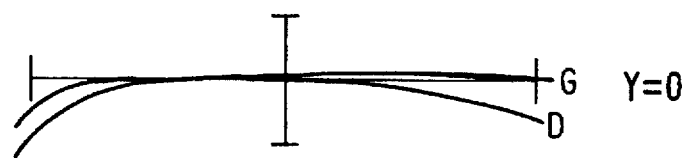
Figure 2I:
Figure 3:
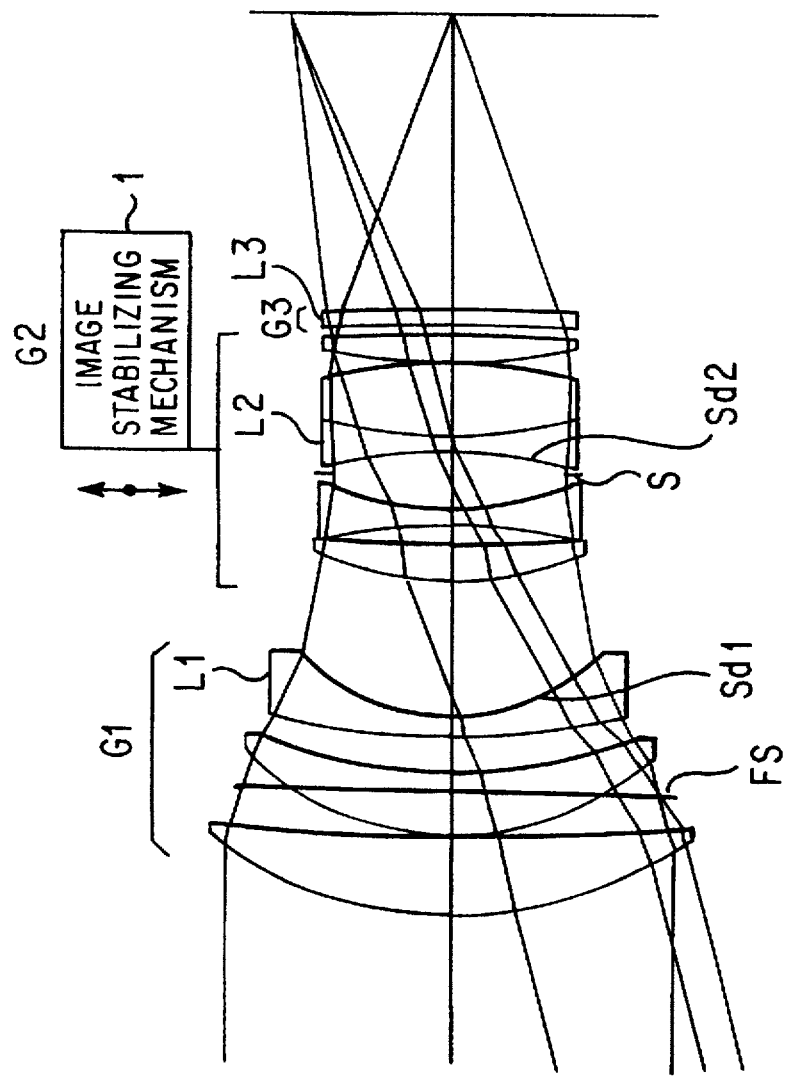
FIG. 3 shows the schematic structure of a Gauss lens in a second embodiment of the present invention.
Figure 4D:
Figure 4E:
Figure 4F:
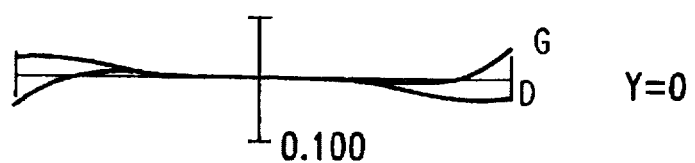
Figure 4G:
Figure 4H:
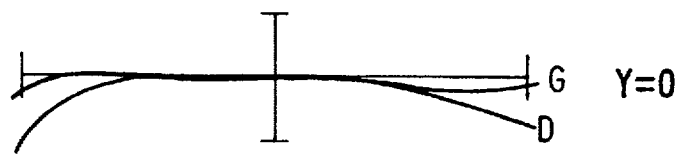
Figure 4I:
Figure 5:
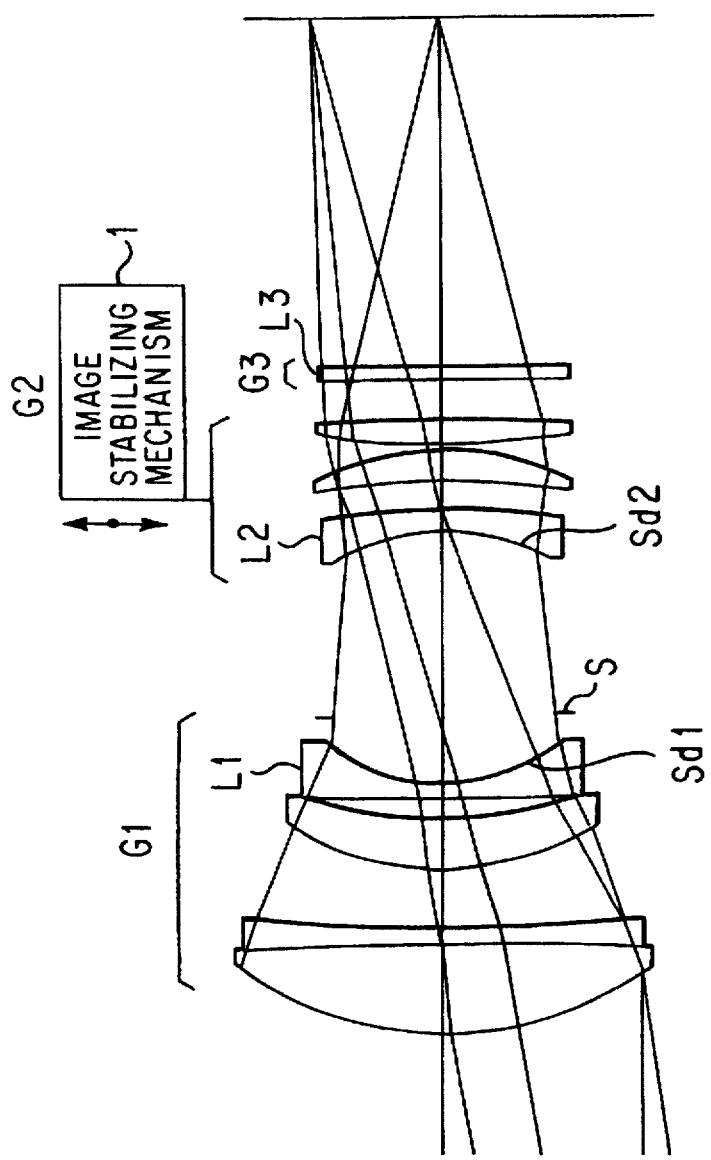
FIG. 5 shows the schematic structure of a Gauss lens in a third embodiment of the present invention.
Figure 6D:
Figure 6E:
Figure 6F:
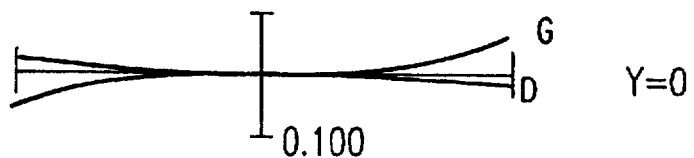
Figure 6G:
Figure 6H:
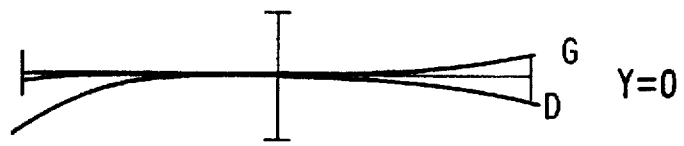
Figure 6I:

As shown in FIGS. 1, 3, and 5, each embodiment of Gauss lens with an image stabilizing function in the present invention comprises, in order from object side, at least a first lens group G1 with positive refractive power and the second lens group G2 with positive refractive power. A negative lens component L1 having divergent surface Sd1 with its convex surface facing the object side is placed closest to the image side in the first lens group G1 and a negative lens component L2 having divergent surface Sd2 with a convex surface facing the image side is placed adjacent to the image side of the aperture stop. A displacement mechanism is provided to move the second lens group G2 in the direction substantially perpendicular to the optical axis to prevent vibration.

The Gauss lens of the present invention satisfies condition (1) below.

$$0.2 < f2/f < 4.0 \tag{1}$$

where, f2: focal length of the second lens group G2, and
f: focal length of the totality of the lens system.

Condition (1) defines an appropriate range for the ratio of the focal length f2 of the second lens group G2 and the focal length f of the totality of the lens system at the infinite photographic state.

When the upper limit of condition (1) is exceeded, the total length of the lens system becomes long and miniaturization cannot be achieved. Additionally, breaching the upper limit of this condition causes excessively large spherical aberrations on the positive side.

On the other hand, when the lower limit of condition (1) is breached, the focal length f2 of the second lens group G2 becomes too small, causing a tendency for excessively large spherical aberration on the negative side. Moreover, it becomes easy for the Petzval sum to be sharply shifted to positive side, causing an inconvenient tendency to produce curvature of the image plane in the negative direction.

Here, the upper limit and the lower limit of condition (1) should preferably be made 1.5 and 0.5 respectively to obtain even better imaging quality.

Moreover, the Gauss lens of the present invention should satisfy the conditions (2) and (3) below.

$$\Delta S/f2<0.1 \tag{2}$$

$$0.3<f1/f2<5.0 \tag{3}$$

where, f1: focal length of the first lens group G1, and

ΔS: magnitude of the maximum displacement amount of the second group G2 in the direction perpendicular to the optical axis during prevention of vibration.

Condition (2) defines an appropriate range for the magnitude ΔS of the maximum displacement amount of the second group G2 in the direction perpendicular to the optical axis during prevention of vibration and the focal length f2 of the second lens group G2.

When the upper vibration limit of condition (2) is exceeded, the magnitude of the maximum displacement amount of the second group G2, an image stabilizing lens group, becomes too large during prevention of vibration. As a result, the amount of aberration varieties. In particular, the inconvenient aberration variation is due to an increase in the difference in the axial direction between the best image plane in the meridional direction and the best image plane in the sagittal direction in the marginal area of the image plane.

Here, the upper limit of condition (2) should preferably be changed to 0.05 to obtain even better imaging quality.

Condition (3) defines an appropriate region for the ratio of the focal length f1 of the first lens group to the focal length f2 of the second lens group G2.

When the upper limit of condition (3) is exceeded, the focal length f1 of the first lens group becomes too large, causing the diameter of the lens closer to the image side in the first lens group G1 to become large. Therefore, it becomes difficult to achieve the objective of making the total lens system smaller.

On the other hand, when the lower limit of condition (3) is breached, the focal length f2 of the second lens group G2 becomes too small, causing the back focal length to become extremely short. Moreover, it becomes easy for the spherical aberrations to become too large on the negative side. Both of these effects are undesirable.

Here, the upper limit and the lower limit of condition (3) should be preferably changed to 3.0 and 1.5 respectively in order to miniaturize the lens system and to obtain even better imaging quality.

Conditions (4) and (5) below should be satisfied in order to obtain even better imaging quality.

$$0.2<Hex/Hin<1.0 \tag{4}$$

$$0.6<\phi1/\phi2<5.0 \tag{5}$$

The variables are defined as follows:

Hex: The height at which the light ray most distant from the optical axis passes through the last surface of the optical system;

Hin: The height at which the light ray most distant from the optical axis passes through the first surface of the optical system;

$\phi1$: refractive power of divergent surface Sd1; and $\phi2$: refractive power of divergent surface Sd2.

Here, the last surface and the first surface of the optical system refer to the surface closest to the image and the surface closest to the object respectively of all the surfaces with refractive power in the lens system.

Condition (4) aims to achieve reduction in weight of the second lens group G2. The second lens group moves in the direction perpendicular to the optical axis during prevention of vibration.

The closer the ratio is to the lower limit of condition (4), the smaller the outer diameter of the second lens group can be made, and the lighter the weight of the lenses can be made. However, if the lower limit of condition (4) is breached, the refractive power of each lens group becomes too strong, causing difficulty in aberration correction. Moreover, the back focal length becomes insufficient, especially if long back focal length is required as in the case of single lens reflex cameras.

On the other hand, if the upper limit of condition (4) is exceeded, the outer diameter of the second lens group G2 becomes large, possibly resulting in enlargement of the lens system. Moreover, a large amount of driving power is required to move the second lens group G2 in the direction perpendicular to the optical axis during prevention of vibration. This power requirement is undesirable from a practical point of view.

Condition (5) defines an appropriate range for the ratio of the refractive power of the divergent surface Sd1 to the refractive power of the divergent surface Sd2. When the range defined by condition (5) is breached, favorable aberration balance will be lost, making it difficult to obtain excellent imaging quality.

To be more specific, if the upper limit of condition (5) is exceeded, the refractive power $\phi1$ of the divergent surface Sd1 becomes too strong, causing spherical aberrations to become too large in the negative direction.

On the other hand, if the lower limit of condition (5) is breached, the refractive power $\phi2$ of the divergent surface Sd2 becomes too strong, making it easy for curvature of the image plane to become too large in the positive direction.

Moreover, if either limit of the condition (5) is breached, correction of coma aberrations becomes difficult.

Here, the upper limit and the lower limit of the condition (5) should preferably be changed to 2.5 and 1.0 respectively in order to obtain even better imaging quality.

Moreover, the conditions (6) and (7) below should be satisfied in the present invention.

$$0.12<Y/f<0.5 \tag{6}$$

$$40<\nu+ \tag{7}$$

The variables are defined as follows:

Y: the maximum image height; and

ν+: the maximum value of the Abbe numbers of the positive lens component in the second lens group G2.

Condition (6) defines an appropriate range for the ratio of the focal length of the totality of the lens system to the maximum image height.

If the upper limit of condition (6) is exceeded, it becomes easy for the Petzval sum to be a positive number that is too large.

On the other hand, if the lower limit of condition (6) is breached, the field angle becomes too large, and off-axis aberration, especially image plane distortion and coma aberration, cannot be completely corrected. Moreover, back focal length tends to be insufficient.

Condition (7) is important in obtaining favorable chromatic aberration correction even during image stabilizing.

When the lower limit of condition (7) is breached, the on-axis chromatic aberration of short waves tends to become too large in the negative direction during image stabilizing as well as in the infinite photographic state. Hence it becomes difficult to obtain good imaging quality.

Here, satisfactorily good optical quality can be achieved with only the first lens group G1 and the second lens group G2. However, in structuring an actual optical system, even better optical quality is obtained by adding a group of lenses with weak refractive power to the image side of the second lens group G2.

Moreover, it becomes possible to focus on close distance objects by moving along the optical axis at least one component of the system that is on the object side of the aperture stop or the second lens group, which is a image stabilizing lens group. Furthermore, it is obvious that focusing on close distance objects can also be accomplished by advancing the totality of the optical system as one unit towards the object side.

Moreover, in actually structuring the image stabilizing lens group G2, a plurality of lenses, at least one negative lens and at least two positive lenses, should be used.

Moreover, in order to obtain excellent imaging quality, the negative lens component L1 having divergent surface Sd1 to be placed closest to the image side in the first lens group G1 should be a negative meniscus lens with the convex surface facing the object side.

Furthermore, the negative lens component L2 having a divergent surface Sd2 with the convex surface facing the image side should be placed adjacent the image side of the aperture stop and should be either a negative meniscus lens with convex surface facing the object side or a biconcave lens. In this case, a cemented lens formed by cementing a convex lens onto the image side of the negative lens L2 is preferable in order to achieve Petzval sum correction and chromatic aberration correction.

In addition, in order to favorably correct spherical aberration and image plane distortion, the focal length fL1 of the negative lens component L1 and the focal length fL2 of the negative lens component L2 should satisfy the conditions (8) and (9) below.

$$0.2 < |fL1|/f < 0.8 \quad (8)$$

$$0.4 < |fL2|/f < 0.6 \quad (9)$$

Moreover, in order to obtain excellent flatness of the image during image stabilizing, the Petzval sum PV of the image stabilizing lens group G2 and the Petzval sum PA of the totality of the optical system should satisfy the condition:

$$0 < PV/PA < 8.0 \quad (10)$$

Furthermore, it is possible to vary the blurriness of an image by moving part of lens group closer to the object side from the aperture stop along the optical axis.

Moreover, by providing a fixed flare stop on the optical axis separate from the aperture stop, undesirable light rays can be shielded when the image stabilizing lens group G2 changes position perpendicular to the optical axis to prevent vibration, thus preventing the occurrence of ghost images and unnecessary exposure.

Each embodiment of the present invention is described hereafter, with reference to attached drawings.

FIG. 1 illustrates the structure of a Gauss lens in a first embodiment of the present invention. The Gauss lens in the figure comprises, in order from the object side, first lens group G1 comprising a positive meniscus lens with a convex surface facing the object side, a positive meniscus lens with a convex surface facing the object side, and a negative meniscus lens L1 with a convex surface facing the object side, and the second lens group G2 comprising a negative meniscus lens L2 with a concave surface facing object side, a positive meniscus lens with a concave surface facing the object side and a biconvex lens.

Here, an aperture stop S is provided between the first lens group G1 and the second lens group G2, and a fixed flare stop FS is provided within the second lens group G2.

In this manner, a negative meniscus lens L1 having a divergent surface Sd1 with a convex surface facing object side is placed closest to the image side in the first lens group G1 and a negative meniscus lens L2 having a divergent surface Sd2 with a convex surface facing the image side is placed adjacent to the image side of the aperture stop.

Moreover, the second lens group G2 is properly moved in the direction substantially perpendicular to the optical axis by an image stabilizing mechanism 1, which comprises a displacement mechanism.

The first embodiment is an application of the present invention to a medium telephoto lens.

The values of various dimensions of the first embodiment of the present invention are listed in Table (1) below. In Table (1), f denotes focal length at infinite photographic state, FNO denotes F-number at infinite photographic state, and Bf denotes back focal length. Moreover, the number in the far left column indicates the order of the lens surfaces from the object side, r denotes the radius of curvature of each lens surface, d denotes spacing of each lens, n(D) and vdenote respectively refractive indices and Abbe numbers corresponding to a d-line ($\lambda$=587.6 nm), and n(G) denotes refractive indices corresponding to a g-line ($\lambda$=435.8 nm).

TABLE 1 f = 84.813
FNO = 1.82

| | r | d | v | n(D) | n(G) |
|---|---|---|---|---|---|
| 1 | 42.3999 | 8.8000 | 46.80 | 1.766840 | 1.787458 |
| 2 | 223.2006 | 0.2000 | | | |
| 3 | 32.6050 | 7.8000 | 50.19 | 1.719999 | 1.737966 |
| 4 | 59.9741 | 1.6000 | | | |
| 5 | 111.1726 | 3.2000 | 26.05 | 1.784702 | 1.824530 |
| 6 | 21.4904 | 8.6000 | | | |
| 7 | ∞ | | 19.1865 (aperture stop S) | | |
| 8 | −24.5559 | 2.4000 | 35.70 | 1.625882 | 1.648520 |
| 9 | −115.0208 | 2.0000 | | | |
| 10 | −71.2481 | 5.0000 | 53.72 | 1.693500 | 1.709624 |
| 11 | −29.7539 | −1.0000 | | | |
| 12 | ∞ | | 1.2000 (fixed flare stop FS) | | |
| 13 | 82.8155 | 5.0000 | 46.80 | 1.766840 | 1.787458 |
| 14 | −140.4708 | | 38.2936 (Bf) | | |

Image stabilizing data

| | |
|---|---|
| Infinite photographic state Amount of movement of image stabilizing lens group in the direction perpendicular to optical axis (mm) | 1.0 |

TABLE 1-continued

Amount of image movement (mm)  +0.389
(+ for the sign of amount of image movement
indicates that movement of image is in the
same direction as movement of the lens)
Preferred values corresponding to conditions f = 84.813
f1 = 138.546
f2 = 71.767
ΔS = 1.0
Hex = 11.084
Hin = 23.348
φ1 = −0.0365
φ2 = −0.0255
Y = 21.6
fL1 = −34.490
fL2 = −50.399
(1) f2/f = 0.846
(2) ΔS/f2 = 0.0139
(3) f1/f2 = 1.931
(4) Hex/Hin = 0.475
(5) φ1/φ2 = 1.431
(6) Y/f = 0.255
(7) ν+ = 53.72
(8) !fL1!/f = 0.407
(9) !fL2!/f = 0.594
(10) PV/PA = 2.42

FIGS. 2(a)–2(i) show various aberration diagrams at the infinite photographic state in the first embodiment of the invention.

In each aberration diagram, FNO denotes F-number, Y denotes image height, D denotes d-line (λ=587.6 nm), and G denotes g-line (λ=435.8 nm) respectively. Moreover, in the aberration diagram describing astigmatism, the solid line represents the sagittal image plane while the broken line represents the meridional image plane.

Each aberration diagram clearly shows that various aberrations are favorably corrected including during image stabilizing operations in the present invention.

FIG. 3 illustrates the structure of a Gauss lens in a second embodiment of the present invention. The Gauss lens in FIG. 3 comprises, in order from the object side, the first lens group G1 comprising a positive meniscus lens with a convex surface facing the object side, a positive meniscus lens with a convex surface facing the object side, and a negative meniscus lens L1 with a convex surface facing the object side and the second lens group G2 comprising a positive meniscus lens with a convex surface facing the object side, a biconcave lens, a negative cemented lens L2 having a biconcave lens and a biconvex lens, a biconvex lens, and a third lens group G3 comprising a positive meniscus lens L3 with the concave surface facing the object side.

Here, an aperture stop S is provided adjacent to the object side of the biconcave lens L2 in the second lens group G2, and a fixed flare stop FS is provided within the first lens group G1.

In this manner, a negative meniscus lens L1 having a divergent surface Sd1 with a convex surface facing object side is placed closest to the image side in the first lens group G1 and a biconcave lens L2 having a divergent surface Sd2 with a convex surface facing the image side is placed adjacent to the image side of the aperture stop.

Moreover, the second lens group G2 is properly moved in the direction substantially perpendicular to the optical axis by an image stabilizing mechanism 1, which comprises a displacement mechanism.

The second embodiment is an application of the present invention to medium telephoto lens which is well corrected for a large aperture.

The values of various dimensions of the second embodiment of the present invention are listed in Table (2) below. In Table (2), f denotes focal length at infinite photographic state, FNO denotes F-number at infinite photographic state, and Bf denotes back focal length. Moreover, the number in the far left indicates the order of the lens surfaces from the object side, r denotes the radius of curvature of each lens surface, d denotes the spacing of each lens, n(D) and νdenote respectively refractive indices and Abbe numbers corresponding to a d-line (λ=587.6 nm), and n(G) denotes refractive indices corresponding to a g-line (λ=435.8 nm).

TABLE 2 f = 85.004
FNO = 1.43

| | r | d | ν | n(D) | n(G) |
|---|---|---|---|---|---|
| 1 | 54.64471 | 10.4000 | 65.42 | 1.603001 | 1.614372 |
| 2 | 386.27892 | 6.10000 | | | |
| 3 | ∞ | −6.00000 (fixed flare stop FS) | | | |
| 4 | 41.38410 | 8.10000 | 46.54 | 1.804109 | 1.825809 |
| 5 | 69.64212 | 4.70000 | | | |
| 6 | 108.15338 | 2.40000 | 29.46 | 1.717360 | 1.749224 |
| 7 | 28.13169 | 17.79989 | | | |
| 8 | 46.38144 | 4.40000 | 39.61 | 1.804540 | 1.830503 |
| 9 | 238.42033 | 2.40000 | | | |
| 10 | −84.93372 | 2.20000 | 33.75 | 1.648311 | 1.673232 |
| 11 | 44.21024 | 4.00000 | | | |
| 12 | ∞ | 3.40000 (aperture stop S) | | | |
| 13 | −53.70114 | 2.00000 | 32.17 | 1.672700 | 1.699894 |
| 14 | 65.26338 | 9.50000 | 39.82 | 1.869940 | 1.897730 |
| 15 | −57.84469 | 0.10000 | | | |
| 16 | 93.45889 | 3.50000 | 47.47 | 1.787971 | 1.808793 |
| 17 | −213.85833 | 1.20016 | | | |
| 18 | −326.60529 | 2.00000 | 52.30 | 1.748099 | 1.765893 |
| 19 | −245.13864 | 38.12012(Bf) | | | |

Image stabilizing data

Infinite photographic state    0.5
Amount of movement of image
stabilizing lens group in the
direction perpendicular to
optical axis (mm)
Amount of image movement (mm)    +0.298
(+ for the sign of amount of image movement
indicates that movement of image is in the
same direction as movement of the lens)
Preferred values corresponding to conditions f = 85.004
f1 = 178.031
f2 = 74.934
ΔS = 0.5
Hex = 14.344
Hin = 29.709
φ1 = −0.0255
φ2 = −0.0125
Y = 21.6
fL1 = −53.674
fL2 = −43.500
(1) f2/f = 0.882
(2) ΔS/f2 = 0.00667
(3) f1/f2 = 2.376
(4) Hex/Hin = 0.483
(5) φ1/φ2 = 2.04
(6) Y/f = 0.251
(7) ν+ = 47.47
(8) !fL1!/f = 0.631
(9) !fL2!/f = 0.512
(10) PV/PA = 1.121

FIGS. 4(a)–4(i) show various aberration diagrams at the infinite photographic state for the second embodiment.

In each aberration diagram, FNO denotes F-number, Y denotes image height, D denotes d-line (λ=587.6 nm), and G denotes g-line (λ=435.8 nm) respectively. Moreover, in the aberration diagram illustrating astigmatism, the solid line represents the sagittal image plane while the broken line represents the meridional image plane.

Each aberration diagram clearly shows that various aberrations are favorably corrected including during image stabilizing in the present invention.

FIG. 5 illustrates the structure of a Gauss lens in a third embodiment of the present invention. The Gauss lens in the figure comprises, in order from the object side, the first lens group G1 comprising a positive cemented lens having a biconvex lens and a biconcave lens, a positive meniscus lens with a convex surface facing the object side, and a negative meniscus lens L1 with a convex surface facing the object side and the second lens group G2 comprising a negative meniscus lens L2 with a concave surface facing the object side, a positive meniscus lens with a concave surface facing the object side, and a biconvex lens. A third group comprising a parallel plane slate L3 is adjacent the second lens group G2 on the image side.

Here, an aperture stop S is provided between the first lens group G1 and the second lens group G2.

In this manner, a negative meniscus lens L1 having a divergent surface Sd1 with a convex surface facing object side is placed closest to the image side in the first lens group G1 and a negative meniscus lens L2 having a divergent surface Sd2 with a convex surface facing the image side is placed adjacent to the image side of the aperture stop.

Moreover, the second lens group G2 is properly moved in the direction substantially perpendicular to the optical axis by an image stabilizing mechanism, which comprises a displacement mechanism.

The third embodiment is an application of the present invention to a lens with slightly long focal length.

The values of various dimensions of the third embodiment of the present invention are listed in Table (3) below. In Table (3), f denotes focal length at infinite photographic state, FNO denotes F-number at infinite photographic state, and Bf denotes back focal length. Moreover, the number in the far left indicates the order of the lens surfaces from the object side, r denotes the radius of curvature of each lens surface, d denotes the spacing of each lens, n(D) and νdenote respectively refractive indices and Abbe numbers corresponding to a d-line ($\lambda$=587.6 nm), and n(G) denotes refractive indices corresponding to a g-line ($\lambda$=435.8 nm).

TABLE 3

| | f = 134.891 FNO = 2.06 | | | | |
|---|---|---|---|---|---|
| | r | d | ν | n(D) | n(G) |
| 1 | 59.2320 | 14.0000 | 53.72 | 1.693500 | 1.709620 |
| 2 | −559.4200 | 3.0000 | 33.75 | 1.648310 | 1.673230 |
| 3 | 391.8626 | 8.0001 | | | |
| 4 | 47.5570 | 8.0000 | 50.17 | 1.720000 | 1.737970 |
| 5 | 86.8690 | 3.0000 | | | |
| 6 | 606.5590 | 3.0000 | 31.62 | 1.756920 | 1.788010 |
| 7 | 33.3406 | 10.0000 | | | |
| 8 | ∞ | 30.0000 (aperture stop S) | | | |
| 9 | −33.8890 | 3.0000 | 31.07 | 1.688930 | 1.717820 |
| 10 | −141.6580 | 5.0000 | | | |
| 11 | −148.6660 | 5.0000 | 46.79 | 1.766840 | 1,787460 |
| 12 | −45.0060 | 1.0000 | | | |
| 13 | 134.7120 | 4.0000 | 45.37 | 1.796680 | 1.818800 |
| 14 | −210.1268 | 6.5102 | | | |
| 15 | ∞ | 2.0000 | 64.12 | 1.516800 | 1.526700 |
| 16 | ∞ | 55.8969 (Bf) | | | |

TABLE 3-continued

| Image stabilizing data | |
|---|---|
| Infinite photographic state | 0.5 |
| Amount of movement of image stabilizing lens group in the direction perpendicular to optical axis (mm) | |
| Amount of image movement (mm) (+ for the sign of amount of image movement indicates that movement of image is in the same direction as movement of the lens) | +0.248 |
| Preferred values corresponding to conditions | |
| f = 134.891 | |
| f1 = 267.065 | |
| f2 = 97.298 | |
| ΔS = 0.5 | |
| Hex = 16.064 | |
| Hin = 32.746 | |
| φ1 = −0.0227 | |
| φ2 = −0.0203 | |
| Y = 21.6 | |
| fL1 = −46.715 | |
| fL2 = −65.402 | |
| (1) f2/f = 0.721 | |
| (2) ΔS/f2 = 0.00514 | |
| (3) f1/f2 = 2.745 | |
| (4) Hex/Hin = 0.491 | |
| (5) φ1/φ2 = 1.12 | |
| (6) Y/f = 0.161 | |
| (7) ν+ = 46.79 | |
| (8) |fL1|/f = 0.346 | |
| (9) |fL2|/f = 0.485 | |
| (10) PV/PA = 4.368 | |

FIG. 6 shows various aberration diagrams at the infinite photographic state in the third embodiment.

In each aberration diagram, FNO denotes F-number, Y denotes image height, D denotes d-line ($\lambda$=587.6 nm), and G denotes g-line ($\lambda$=435.8 nm) respectively. Moreover, in the aberration diagram illustrating astigmatism, the solid line represents the sagittal image plane while the broken line represents the meridional image plane.

Each aberration diagram clearly shows that various aberrations are favorably corrected including during image stabilizing operations in the present invention.

As described above, the present invention is capable of providing a compact and light weight Gauss lens having an image stabilizing function with sufficient brightness and back focal length, and excellent imaging quality well suited for photographic and video use.

While this invention has been described in conjunction with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the scope of the invention as defined in the following claims.

What is claimed is:

1. A Gauss lens system having a plurality of lens groups and an aperture stop positioned along an optical axis from an object side to an image side, the lens system having an image stabilizing function, and comprising:

a first lens group adjacent the object side, with positive refractive power, the first lens group comprising a negative lens component having a first divergent surface and a convex surface facing the object side and placed closest to the image side;

a second lens group with positive refractive power on the image side of the first lens group, the second lens group comprising a negative lens component having a second divergent surface and a convex surface facing the image side and placed adjacent to the image side of the aperture stop; and a displacement mechanism that moves the second lens group in a direction substantially perpendicular to the optical axis to prevent vibration, wherein a focal length f2 of the second lens group and a focal length f of the lens system are related such that image stabilization can be achieved;

wherein a height Hex at which light rays farthest from the optical axis pass through a surface having refractive power closest to the image side of the lens system, a height Hin at which light rays farthest from the optical axis pass through a surface having refractive power closest to the object side, a refractive power $\phi1$ of the first divergent surface, and a refractive power $\phi2$ of the second divergent surface satisfy $0.2<Hex/Hin<1.0$ and $0.6<\phi1/\phi2<5.0$.

2. The Gauss lens system according to claim 1, wherein a focal length f of the lens system and a focal length f2 of the second lens group satisfy $0.2<f2/f<4.0$.

3. The Gauss lens system according to claim 1, wherein a focal length f1 of the first lens group, the focal length f2 of the second lens group, and a maximum displacement amount $\Delta S$ of the second lens group in the direction perpendicular to the optical axis during image stabilizing satisfy $\Delta S/f2<0.1$ and $0.3<f1/f2<5.0$.

4. The Gauss lens system according to claim 3, wherein the focal length f of the lens system and the focal length f2 of the second lens group further satisfy $0.5<f2/f<1.5$.

5. The Gauss lens system according to claim 3, wherein the focal length f1 of the first lens group, the focal length f2 of the second lens group, and the maximum displacement amount $\Delta S$ of the second lens group in the direction perpendicular to the optical axis during image stabilizing further satisfy $\Delta S/f2<0.05$ and $1.5<f1/f2<3.0$.

6. The Gauss lens system according to claim 1, wherein the refractive power $\phi1$ of the first divergent surface, and the refractive power $\phi2$ of the second divergent surface further satisfy $1.0<\phi1/\phi2<2.5$.

7. The Gauss lens system according to claim 1, wherein the focal length f of the lens system, a height Y of a highest image and a maximum Abbe number v+ of a positive component in the second lens group G2 satisfy $0.12<Y/f<0.5$ and $40<v+$.

8. The Gauss lens system according to claim 1, wherein a fixed flare stop is provided on the optical axis to shield undesirable light rays when the second lens group moves to prevent vibration in the direction substantially perpendicular to the optical axis.

9. The Gauss lens system according to claim 1, wherein the aperture stop is positioned adjacent the first lens group on the image side and a fixed flare stop is positioned within the second lens group.

10. The Gauss lens system according to claim 1, wherein the aperture stop is positioned within the second lens group and a fixed flare stop is positioned within the first lens group.

11. The Gauss lens system according to claim 1, wherein the aperture stop is positioned adjacent the first lens group on the image side and further comprising a third group positioned adjacent the second lens group on the image side, the third group comprising a parallel plane plate.

12. A Gauss lens system having a plurality of lens groups positioned along an optical axis from an object side to an image side, the lens system having an image stabilizing function, and comprising:

a first lens group adjacent the object side, with positive refractive power, the first lens group comprising a negative lens component having a first divergent surface and a convex surface facing the object side and placed closest to the image side;

a second lens group with positive refractive power on the image side of the first lens group, the second lens group comprising a negative lens component having a second divergent surface and a convex surface facing the image side and placed adjacent to the image side of an aperture stop; and displacement means for moving the second lens group in a direction substantially perpendicular to the optical axis to prevent vibration, wherein a focal length f2 of the second lens group and a focal length f of the lens system satisfy $0.2<f2/f<4.0$;

wherein a height Hex at which light rays furthest from the optical axis pass through a surface having refractive power closest to the image side of the lens system, a height Hin at which light rays furthest from the optical axis pass through a surface having refractive power closest to the object side, a refractive power $\phi1$ of the first divergent surface, and a refractive power $\phi2$ of the second divergent surface satisfy $0.2<Hex/Hin<1.0$ and $0.6<\phi1/\phi2<5.0$.

13. The Gauss lens system according to claim 12, wherein a focal length f1 of the first lens group, the focal length f2 of the second lens group, and a maximum displacement amount $\Delta S$ of the second lens group in the direction perpendicular to the optical axis during image stabilizing satisfy $\Delta S/f2<0.1$ and $0.3<f1/f2<5.0$.

14. The Gauss lens system with the image stabilizing function according to claim 12, wherein the focal length f of the lens system, a height Y of the highest image and a maximum Abbe number v+ of a positive component in the second lens group G2 satisfy $0.12<Y/f<0.5$ and $40<v+$.

15. The Gauss lens system according to claim 12, wherein a fixed flare stop is provided on the optical axis in order to shield undesirable light rays when the second lens group moves to prevent vibration in the direction substantially perpendicular to the optical axis.

16. The Gauss lens system according to claim 12, wherein the focal length f of the lens system and the focal length f2 of the second lens group further satisfy $0.5<f2/f<1.5$.

17. A method for achieving image stabilization in a Gauss lens system having a plurality of lens groups positioned along an optical axis from an object side to an image side, the method comprising:

providing a first lens group adjacent the object side, with positive refractive power, the first lens group comprising a negative lens component having a first divergent surface and a convex surface facing the object side placed closest to the image side;

providing a second lens group with positive refractive power on the image side of the first lens group, the second lens group comprising a negative lens component having a second divergent surface and a convex surface facing the image side placed adjacent to the image side of an aperture stop; and moving the second lens group in a direction substantially perpendicular to the optical axis to prevent vibration, wherein a focal length f2 of the second lens group and a focal length f of the lens system are related such that image stabilization can be achieved;

wherein a height Hex at which light rays farthest from the optical axis pass through a surface having refractive power closest to the image side of the lens system, a height Hin at which light rays farthest from the optical axis pass through a surface having refractive power closest to the object side, a refractive power $\phi1$ of the divergent surface Sd1, and a refractive power $\phi2$ of the divergent surface Sd2 satisfy $0.2<\text{Hex}/\text{Hin}<1.0$ and $0.6<\phi1/\phi2<5.0$.

18. The method of according to claim 17, further comprising selecting a focal length f of the lens system and a focal length f2 of the second lens group to satisfy $0.2<f2/f<4.0$.

19. The method according to claim 17, further comprising selecting a focal length f1 of the first lens group, a focal length f2 of the second lens group, and a maximum displacement amount $\Delta S$ of the second lens group in the direction perpendicular to the optical axis during image stabilizing to satisfy $\Delta S/f2<0.1$ and $0.3<f1/f2<5.0$.

20. The method according to claim 17, further comprising positioning the lens groups within the lens system such that a focal length f of the lens system, a maximum image height Y and a maximum Abbe number v+ of a positive component in the second lens group satisfy $0.12<Y/f<0.5$ and $40<v+$.

* * * * *